United States Patent

Goodman et al.

[11] Patent Number: 5,891,292
[45] Date of Patent: Apr. 6, 1999

[54] METHOD OF MAKING FIBER REINFORCED COMPOSITES AND COATINGS

[75] Inventors: Daniel L. Goodman, Lexington, Mass.; Guiseppe R. Palmese, Hockessin, Del.

[73] Assignee: Science Research Laboratory, Inc., Somerville, Mass.

[21] Appl. No.: 692,149

[22] Filed: Aug. 5, 1996

[51] Int. Cl.[6] .................................................. B32B 31/00
[52] U.S. Cl. ...................... 156/275.5; 156/242; 156/245; 156/272.2; 156/275.7; 156/330; 156/331.4; 156/331.7
[58] Field of Search .................................. 156/242, 245, 156/272.2, 273.7, 275.5, 275.7, 308.2, 309.6, 330, 331.4, 331.7, 332; 522/90, 93, 94, 97

[56] References Cited

U.S. PATENT DOCUMENTS

| | | | |
|---|---|---|---|
| 3,936,557 | 2/1976 | Watt | 428/211 |
| 4,374,229 | 2/1983 | Dunnavant | 525/28 |
| 4,719,131 | 1/1988 | Kemmerer | 427/386 |
| 4,788,083 | 11/1988 | Dammann | 427/340 |
| 4,902,215 | 2/1990 | Seemann, III . | |
| 5,052,906 | 10/1991 | Seemann . | |
| 5,173,142 | 12/1992 | Billiu . | |
| 5,338,588 | 8/1994 | Billiu | 156/272.2 |
| 5,656,703 | 8/1997 | Costin | 525/531 |

OTHER PUBLICATIONS

Composite Curing With High Energy Electron Beams, Goodman et al., pp. 206–219, 41st International Sampe Symposium, Mar. 24–28, 1996.
"Volume Shrinkafe During Polymerization of Acrolic Monomer", pp. 1–4 Technical Report, no date available.
"Shrinkage Behavior UV/EB Curable Oligomers", UCB Chemicals Corp, no date available.
Radiation Curing—Science Technology, S.P. Pappas, ed., Plenum Press, N.Y. 1992, pp. 4–5, 282–285, 379–380.
"An Introduction to Polymer Networks and IPNs", L.H. Sperling, pp. 1–47, Interpenetrating Polymer Networks and Related Materials, Lehigh University, Plenum Press, N.Y. and London, no date.
"Vitrification and Curing Studies of a Photopolymerizable Semi–Interpenetrating Polymer Network. II", Fitzgerald et al., pp. 1727–1743, Journal of Applied Polymer Science, vol. 40, 1990.
"High Power Electron Accelerators For Industrial Radiation Processing", Marshall R. Cleland, pp. 24–46, Radiation Processing fo Polymers, A. Singh and J. Silverman, eds, Oxford Univ. Press, NY 1992.
"Resin Transfer Molding", Carl F. Johnson, pp. 564–568.
"Electron and X–Ray Curing For Composite Repair", Saunders et al., Research Chemistry Branch AFCI Research—Whiteshell Laboratories, undated.
Radiation Curing—Science Technology, S.P. Pappas, ed., Plenum Press, N.Y. 1992, Chapter 3, pp. 155–237.

Primary Examiner—Jeff H. Aftergut
Attorney, Agent, or Firm—Wolf, Greenfield & Sacks, P.C.

[57] ABSTRACT

The present invention describes materials and methods for forming radiation curable polymer network materials, including coatings, pre-pregs and fiber-reinforced composites. The polymer network materials of the present invention exhibit much lower shrinkage after radiation curing than previous materials and methods, improving the adhesion associated with coatings and pre-pregs, and part fit-up when used to make composite articles.

The present invention also describes an improved method for bonding together articles made by the materials and method of the invention, which results in high-strength bonds between articles.

44 Claims, 5 Drawing Sheets

| FIG. 3A |
|---------|
| FIG. 3B |

METHOD OF MAKING FIBER REINFORCED COMPOSITES AND COATINGS

BACKGROUND

1. Field of the Invention

This invention is related generally to materials and methods for the fabrication of radiation curable composites and coatings, and more particularly to materials and methods for forming radiation curable polymer network coatings and fiber reinforced pre-pregs and structural composites.

2. Background of the Invention

The use of radiation to cure coatings or composites is advantageous because environmentally hazardous solvents are not released during the curing process. In addition, the curing takes place very quickly, and at low temperatures compared to conventional thermal curing. The lower temperatures made possible with radiation curing reduce residual mechanical stresses that accompany conventional thermal curing.

Several processing methods are known for curing composites with radiation, and they are typically divided into two general categories: liquid state radiation curing, which requires the use of a mold, and solid-state radiation curing, which allows the curing of free-standing objects.

Liquid state radiation curing usually involves the injection of a resin into a mold containing reinforcement fibers. Electron beams penetrate into the mold to crosslink the liquid resin matrix. The mold determines the composite's final shape after it is crosslinked to a solid.

Solid state radiation curing involves first producing a self-supporting and easily handled solid object known in the art as a "green-body", followed by radiation curing. The intermediate stage of producing green bodies is known in the art as the "B-stage". Curing while the resin matrix is in a solid state is also known as "free-standing" curing, since a mold is not required during the radiation curing process. The mechanical and thermal properties of a green-body object are improved by subsequent radiation crosslinking.

There are a number of processing and cost advantages to free-standing curing. U.S. Pat. No. 5,173,142, issued on Dec. 22, 1992 describes how free-standing curing can be used to assemble a hollow section assembly. The cost advantages of using free-standing curing instead of conventional steel stamping at moderate production quantities are described in the technical article by D. L. Goodman, D. L. Birx, G. R. Palmese and A. Chen, entitled "Composite Curing with High Energy Electron Beams," in the Journal of the Society for the Advancement of Material and Process Engineering Vol. 41, 207 (1996).

A generic problem in fabricating large structural composite parts is the difficulty of part fit-up. In applications involving the assembly of multiple parts, such as in automotive or aircraft applications, good part fit-up (which refers to how well parts fit together) is necessary to allow final assembly, as well as for aerodynamic and aesthetic reasons. Unlike ductile metals, where the final shape can be modified by mechanical means at the final stages of assembly, rigid polymer matrix composites must achieve part fit-up by maintaining accurate fabrication tolerances.

In conventional composite processing (such as autoclave curing of aircraft composites), part fit-up problems are primarily caused by residual thermal stresses due to thermal expansion mismatch between fiber reinforcement and resin matrix upon cooling.

A major advantage of low-temperature curing processes such as radiation curing is a reduction in residual thermal stresses associated with conventional thermal curing methods. However, radiation curing has an analogous problem: resin shrinkage during curing. In composites, resin shrinkage leads to internal stresses which can cause composite warpage and poor part fit-up. Shrinkage also leads to higher process engineering costs, since molds must be oversized or oddly-shaped to compensate for shrinkage and warpage. In coating and pre-peg applications, shrinkage can contribute to poor adhesion, especially to metal substrates.

Many conventional resin systems used in radiation curing shrink significantly when cured. Volumetric shrinkage values for common acrylic monomers are given in a 1964 Rohm and Haas Company (Washington Square, Pa.) technical report entitled "Volume Shrinkage During Polymerization of Acrylic Monomers," and range from 11–30%. Linear shrinkage of acrylated oligomers are listed in a 1996 UCB Radcure Product Specification entitled "UV/EB Curable Oligomers and Shrinkage Behavior," available from UCB Chemicals Corp., Radcure Business Unit, 2000 Lake Park Dr., Smyrna, Ga., and correspond to volumetric shrinkages of 7–25%. A typical resin formulation, incorporating such oligomers and monomers, will have a volumetric shrinkage of 9–15%.

As described in Chapters 1 and 9 of the book "Radiation Curing, Science and Technology," edited by S. P. Pappas (Plenum Press, NY, 1992), one possible approach to reducing shrinkage of radiation-curable resins is the use of cationic polymerization via cationic initiators possessing highly non-nucleoplilic anions (PF—, AsF— or SbF—). This is an alternative to the more common radiation-curable resin systems of the free-radical type, which possess carbon-to-carbon double bonds that cross-link upon exposure to radiation.

Radiation-induced cationic polymerization has shown lower shrinkage (typically about 6%) than free-radical systems. Cationic catalysts are, however, easily poisoned by nucleophilic resin components, contaminants or fiber sizings, making radiation curin via cationic mechanism difficult. This is especially true for free-standing curing, where the presence of weakly nucleophilic urethane groups or of highly nucleophilic resin "B" components such as amines are incompatible with the use of cationic catalysts.

There is thus needed a method for formulating radiation-curable resins with low shrinkage for use in composite and coating applications, especially where free-standing curing is desired. There is also need a method which eliminates or overcomes the poisoning problem associated with cationic polymerization.

Accordingly, it is an object of the invention to provide a radiation curable polymer network.

Another object of the invention is to provide a radiation cured polymer network that has a reduced shrinkage and warpage.

Another object of the invention is to provide a method for forming radiation curable coatings, composites and pre-pregs made with the radiation curable polymer network of the present invention.

SUMMARY OF THE INVENTION

The present invention is directed to materials and methods for forming radiation curable polymer networks and radiation-cured polymer networks cured thereby. The polymer networks of the present invention can be used as coatings, providing improved adhesion over prior art methods. The polymer networks of the present invention can also be used with reinforcing fibers to form pre-pregs, which are cured in situ, thus providing a very flexible system for patching or reinforcing, for example, an aircraft. The polymer networks of the present invention also can be used to form structural composites with reduced warpage and shrinkage compared to conventional thermal and radiation curing, which improves part fit-up.

One embodiment of the present invention is directed to a radiation curable polymer network that shrinks much less than prior art materials. The polymer network is the reaction product of a polyol oligomer, a polyisocyanate, and a reactive monomer diluent. Various processing aids can optionally be included to facilitate the reaction, such as crosslinking aids and catalysts. A preferred oligomer has hydroxyl groups and unsaturated carbon bonds.

A second embodiment of the present invention is directed to a method for producing a fiber-reinforced composite, pre-preg, or coating. The method involves mixing a two-component resin which can react at or near room temperature to form a B-stage material. The B-stage material can then either be used to coat a substrate or to impregnate the fiber-reinforcing material, resulting in a green-body object, or coating. The green-body is then cured by exposure to radiation, preferably electron beam, forming a polymer network that shrinks much less than prior art methods. When used as a coating or a pre-preg, the decreased shrinkage of the polymer network of the present invention allows for better adhesion than prior art methods.

Another embodiment of the present invention is directed to a method for improving the bond strength of composites that are made up of multiple sections. The method involves using a chemically compatible adhesive, preferably an acrylic structural adhesive, which is applied to selected areas of the parts that are to be bonded together, prior to radiation curing. The parts to be bonded together can be made by the materials and method of the present invention, conventional composites, or other materials. After applying the adhesive, the parts are subjected to radiation, again, preferably electron beam, which chemically links the resin components together while simultaneously forming adhesive bonds between the articles.

Other advantages, novel features and objects of the invention will become apparent from the following detailed description of the invention when considered in conjunction with the accompanying drawings.

DETAILED DESCRIPTION OF THE INVENTION

Polymer Network Material

The polymer network material of the present invention is a thermosetting resin mixture that forms a rigid polymer network, which is further crosslinked with radiation curing to further enhance its thermal and mechanical properties.

The thermosetting resin mixture of the present invention preferably consists of an "A" side containing at least a polyol oligomer, and a "B" side containing at least a polyaromatic isocyanate, mixed in appropriate ratios depending on the intended application. "A" and "B" sides of the mixture are described below with reference to FIG. 4. Mixing can be performed with standard equipment, such as a static or impingement mixer. Such equipment is available from a number of suppliers, including Liquid Control Corp. of North Canton, Ohio.

First Mixture Embodiment "A" Side

Figure 1:
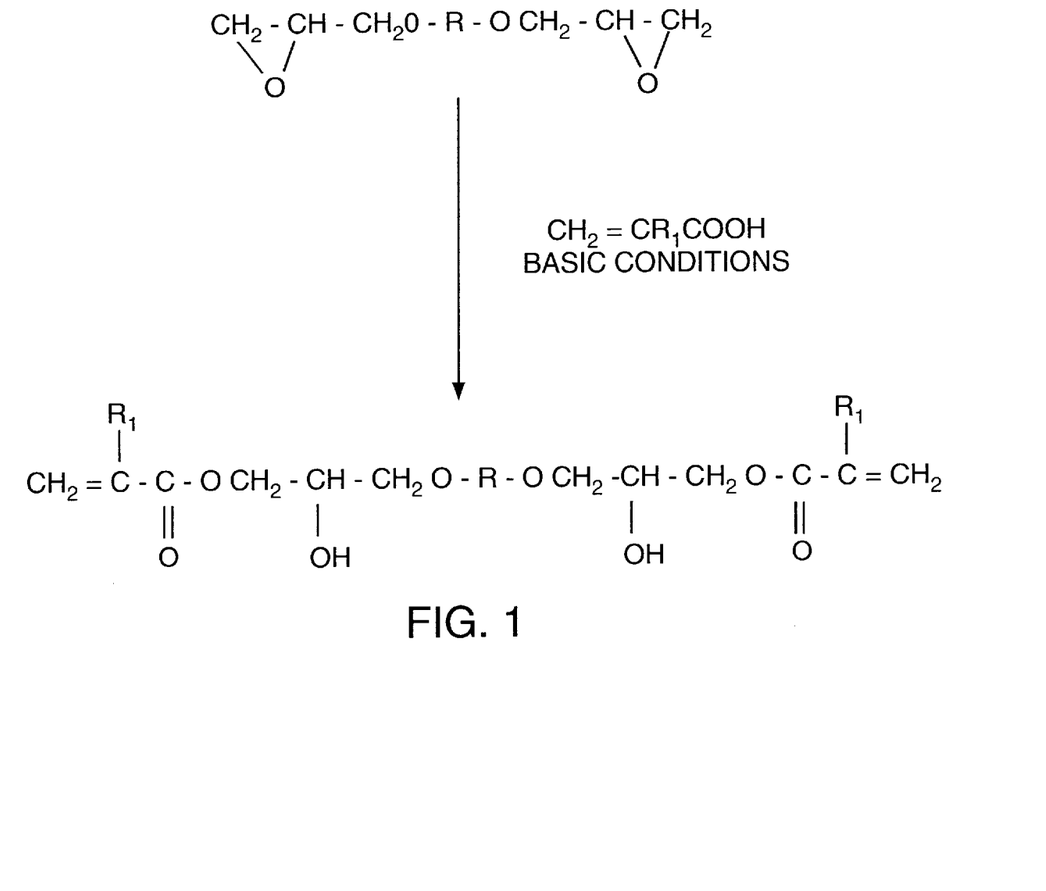
FIG. 1 illustrates the synthesis of a polyol oligomer for use in side "A" of a resin system of the invention.

A preferred polyol oligomer includes a carbon backbone of an aromatic epoxy, hydroxyl groups, and sites of unsaturation such as carbon-to-carbon double bonds. Such a material can by synthesized by the reaction of multi-functional phenolic compounds with molecules containing both epoxy groups and double bonds, in the presence of base. Alternatively, as illustrated in FIG. 1, such a material 24 can be synthesized by the addition of (meth)acrylic acid 22 to a multi-functional epoxy 20. In multi-functional epoxy 20, R preferably is a hydrocarbon linkage (including linear, branched, and cyclic hydrocarbons), optionally interrupted by hetero groups. As used herein, "hydrocarbon" is meant to include alkyl, alkenyl, alkynyl, cycloalkyl, aryl, alkaryl, aralkyl, and the like. Hetero groups can include —O—, —CONH—, —CONHCO—, —NH—, —CSNH—, —CO—, —CS—, —S—, —SO—, —(OCH$_2$CH$_2$)$_n$R (where n=1–10), —(CF$_2$)$_n$— (where n=1–10), olefins, and the like. Most preferably, R is a C$_1$–C$_{10}$ linear alkyl linkage. R$_1$ is as defined for R, and can in addition be H. R$_1$ preferably is H or C$_1$–C$_{10}$ alkyl linkage.

A preferred oligomer composition 24 contains the chemical structure of a typical aromatic epoxy backbone, two or more hydroxyl groups, and two or more carbon-to-carbon double bonds. Several such oligomers, providing a range of composite or coating mechanical and thermal properties are available as the STC3-42 and XKM2-80 series of resins from Bomar Specialties Company of 210 Holabird Ave., Winsted Conn. In addition to pure is oligomers. Lower viscosity oligomer/monomer mixtures to facilitate processing are available from manufacturers such as Bomar Specialties, Sartomer Company, Inc. of 468 Thomas Jones Way, Exton Pa. or UCB Chemicals Corp., 2000 Lake Park Dr, Smyrna Ga.

Figure 2:
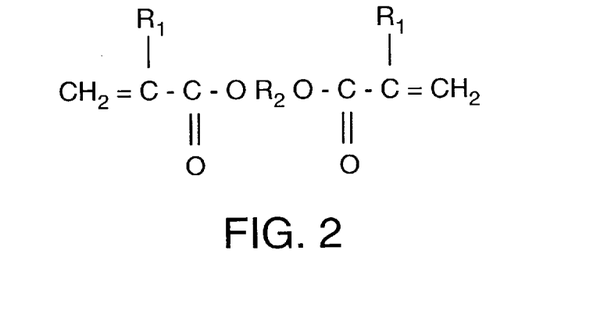
FIG. 2 illustrates a typical reactive monomer diluent which is combined with the polyol oligomer to reduce the mixture viscosity of a resin system of the invention.

Optionally, resin side "A" can also contain at least one low-viscosity reactive diluent monomer with sites of unsaturation such as unsaturated carbon bonds, additional crosslinking agents which allow the final composite properties to be tailored for specific applications, a metal catalyst to increase the thermoset rate to B-stage, and/or other additives, some of which are conventional. FIG. 2 illustrates a preferred reactive diluent monomer in which R$_2$ is selected as is R$_1$, preferably a C$_1$–C$_{10}$ alkyl linkage, which is typically a low viscosity (<500 cps) liquid containing carbon-to-carbon double bonds, but not containing hydroxyl groups. Appropriate reactive diluent monomers are available from Sartomer Company, Inc. and UCB Chemicals Corp. Appropriate reactive diluent monomers and their shrinkage upon radiation cure are contained in the Rohm and Haas technical report and the UCB Radcure product specification described in the background of the invention.

Several optional components can be added to the resin side "A" to increase throughput or for other processing advantages. Low molecular weight multi-functional crosslinking aids containing hydroxyl groups at a 0–5% weight fraction can be added to the resin side "A," for example, to increase the composite hardness at B-stage where the system is used in composite fabrication. Catalysts, including metal catalysts at concentrations from 0.0050–1.0% can be added to decrease the time required to reach B-stage. Mold release agents can be added to facilitate removal of the composite from the mold without sticking.

The desired weight fraction of the polyol oligomer and reactive monomer diluent components of resin side "A" depends on the desired application. In general, the fraction of reactive diluent monomer should be minimized for any application because a high oligomer fraction generally maximizes the physical and thermal properties of the polymer network. Typical resin side "A" values for coatings are 40–70% oligomer, 20–50% monomer and up to 40% pigments and other components; values for composite fabrication are 50–90% oligomer, 10–45% monomer, and 0–5% other components; and values for pre-pregs are 70–95% oligomer, 50–30% monomer and up to 20% other materials, including toughening aids.

The choice, concentration and use of crosslinking aids, catalysts and mold release agents as components of the resin side "A" can be selected by persons skilled in the art without undue experimentation.

"B" Side

The resin side "B" includes a species capable of reacting with the polyol oligomer of side "A" to form a first polymer network that, according to one embodiment, defines in part a green-body at B-stage. As used herein, "polymer network" is meant to define a polymer formed of at least two polyfunctional resin components each of which itself can be a polymer or oligomer. An interpenetrating network is included in the definition of polymer network.

An interpenetrating network is formed from a combination of two polymers in which at least one of the polymers has been synthesized and/or crosslinked in the presence of the other, as described by L. H. Sperling in the 1971 text, "Interpenetrating Polymer Networks and Related Materials," available from Plenum, New York.

The reactive species of resin side "B" is typically an aromatic polyisocyanate such as one of the PAPI 2000 series sold by Dow Chemical Company of Midland, Mich., which are blends of di- and multi-functional isocyanates. The "B" side also can include a reactive diluent monomer as defined above. According to a preferred embodiment, a reactive diluent monomer is included in side "A" or side "B". One class of preferred reactive species for side "B" is polymethylene, polyphenyl, isocyanates, with a particularly preferred species illustrated in FIG. 3 at 26 being 4,4'-methylene bisphenyl isocyanate.

Figures 3, 3A:
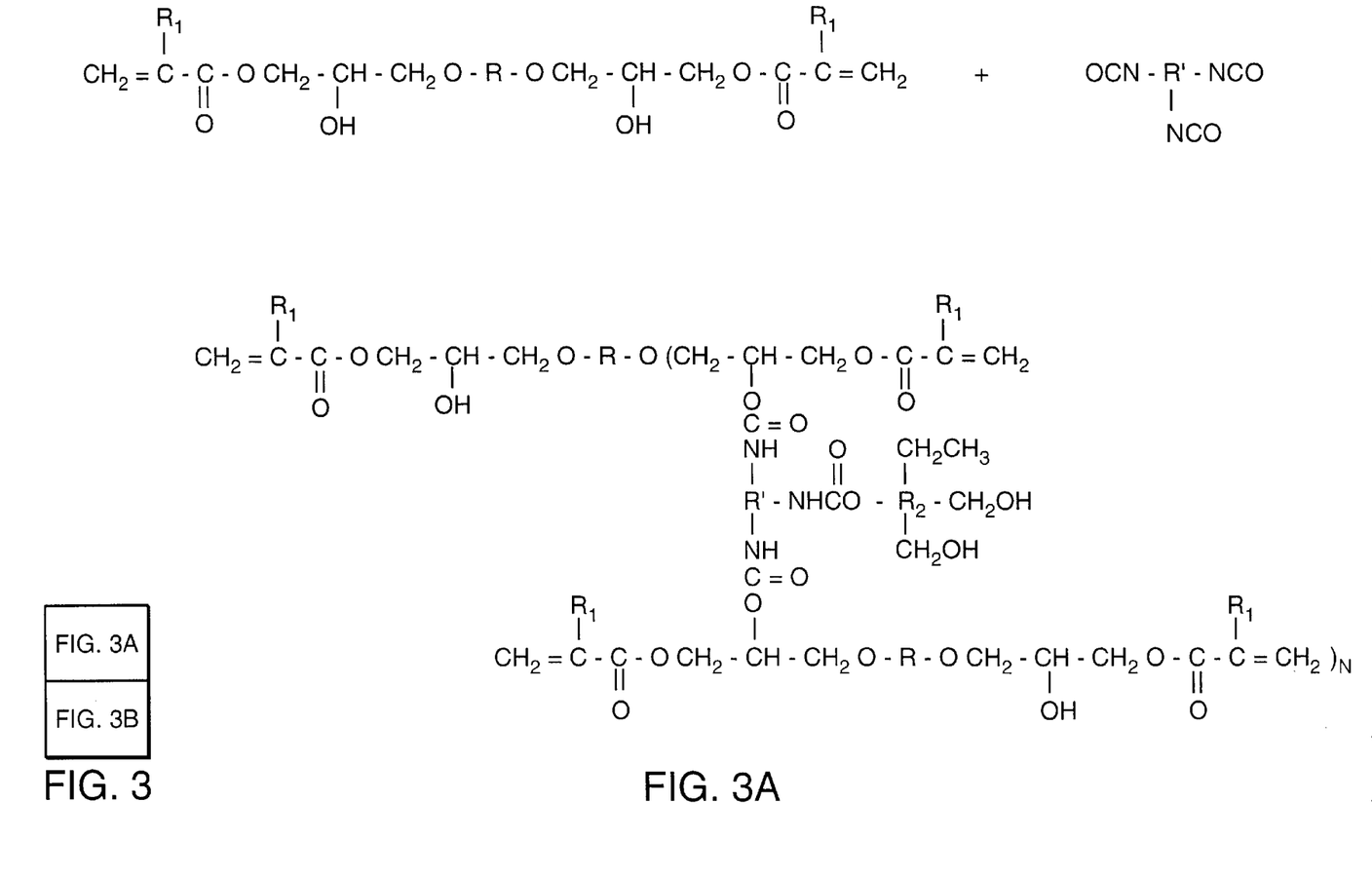
FIG. 3 illustrates a reaction sequence of the polylol oligomer and an isocyanate to form a B-stage polymer network of the invention, followed by the formation of a second polymer network via electron beam radiation curing.
Figure 3B:
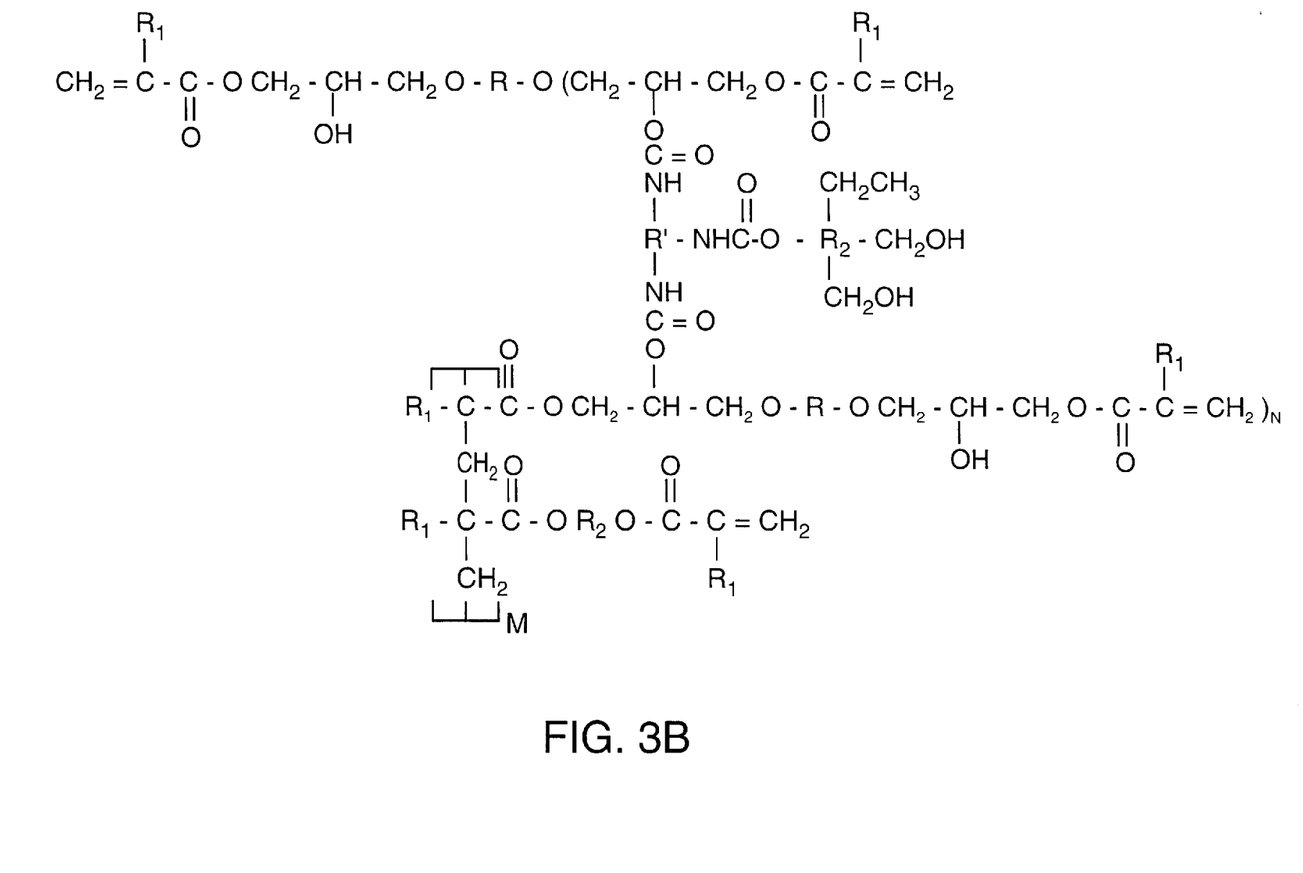

The B-stage is reached by the reaction of the hydroxyl groups of the polyol oligomer with the isocyanate, forming a urethane polymer network 28. The final polymer network 30 is formed by linking the reactive diluent monomer, via two of its functional groups, to two polyol oligomers to form a second polymer network. The step involves exciting carbon-to-carbon double bonds with radiation, preferably electron beam radiation. Other suitable types of radiation that can effect the reaction would be apparent to those of ordinary skill in the art, including, but not limited to ultraviolet, x-ray, gamma, and laser radiation.

Second Mixture Embodiment

In another embodiment of the thermosetting resin composition of the present invention, resin side "A" is a mixture of an epoxy resin with reactive diluents containing sites of unsaturation, including carbon-to-carbon double bonds. A preferred resin is the diglycidyl ether of bisphenol A-type epoxy Epon 828 available from Shell Chemical Company, Houston Tex. In this embodiment, resin side "B" can be any commercial epoxy curing agent, including, but not limited to an amine, an anhydride, and a thiol (mercaptan).

The combination of two reactions—the thermal formation of a first, e.g. urethane, polymer network, from first and second resin components, followed by radiation-induced linking of a third resin component to the first network, produces a final polymer network with substantially less shrinkage than prior art methods, and which can be used for many different applications, including coatings, composites, and pre-pregs. One skilled in the art will be able to vary ratios of compounds used in the thermosetting mixtures of the present invention based on the desired application.

Coating Method

Figure 4:
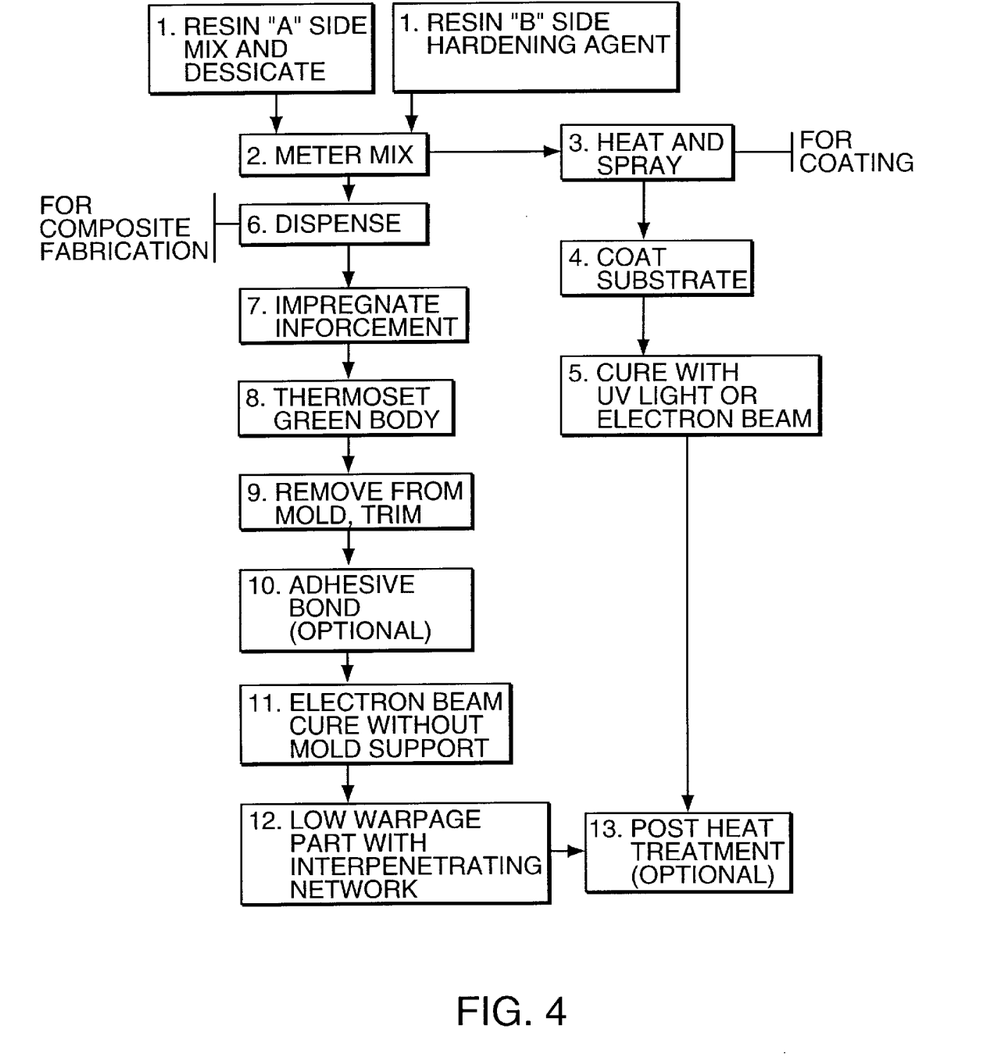
FIG. 4 is a flow diagram of a method for forming fiber reinforced structural composites, and for forming coatings, using the polymer network illustrated in the reaction sequence of FIGS. 1 through 3.

The polymer network of the present invention is advantageous for use as a coating, for example, to improve the corrosion resistance of a metal structure such as an aircraft wing, and because the reduced shrinkage achieved in accordance with the invention promotes better adhesion of the polymer network to surfaces. A preferred formulation for use as a coating preferably includes the addition of a photoinitiator, preferably a free-radical producing photoinitiator, pigments, and surfactants, to the polyol oligomer A-side. As illustrated in FIG. 4, the steps for making a coating are numbered 1–5, and 13. First, the A and B sides are mixed 1 in an appropriate ratio, heated to reduce the viscosity of the mixture, which is then sprayed 3 onto a surface 4. The coated surface 4 is then cured with radiation 5, to form a second polymer network, which restricts shrinkage of the coating, thereby promoting adhesion to the substrate.

During step 3, the reacting coating consisting of meter mixed "A" and "B" liquid streams is heated to reduce its viscosity to facilitate spraying. The mixture is then sprayed using commercial high-volume low-pressure spray equipment. To avoid dripping or non-uniformity, known in the art as "sag", the substrate to be coated during step 4 will in general be at a lower temperature than the liquid. As the mixture is sprayed onto the substrate, the viscosity of the coating increases due to the decreased temperature of the substrate and the isocyanate reaction. If the coating is to be cured at step 5 with ultraviolet (UV) light, a photoinitiator such as benzophenone is added to the resin side "A" at step 1. Suitable photoinitiators and pigments for UV curing are described in Chapter 3 of the 1993 text "Radiation Curing in Polymer Science and Technology, Volume 11: Photoinitiating Systems," edited by J. P. Fouassier and J. F. Rabek, available from Elsevier Applied Science, London, England.

Additionally, a post heat cure 13 can be used to increase the maximum coating use temperature. By heating the radiation cured composite part to an elevated temperature, the final use temperature can be increased. During this step, a part would typically be placed in an oven for approximately one hour at a temperature in the range 120°–180° C. This process will typically increase the final use temperature (before softening) by 40° C. The heat treatment process promotes polymer diffusion, reducing the configuration free energy and inducing further intra-network linkage by utilizing residual free radicals to fully crosslink any unconverted carbon-carbon double bonds.

Another application for the polymer network of the present invention is directed to a method for forming a fiber reinforced composite. A rigid, fiber-reinforced composite can be formed by impregnating fiber reinforcement material which is contained in a mold with the thermosetting resin mixture of the present invention. After reaction to the B-stage, the green-body is removed from the mold and subjected to high energy electron beam radiation to complete the resin cure, thus achieving full thermal and mechanical properties.

FIG. 4 illustrates the process steps 1–2 and 6–13 for making a structural composite using the thermosetting resin mixture and method of the present invention. Structural composite parts are used, for example, in the automotive or aircraft industries. Structural composites made using the material and method of the present invention are advantageous because they have reduced shrinkage compared to prior art methods, which improves part fit-up.

In FIG. 4, the components of resin side "A" are first uniformly mixed and desiccated in step 1 by physical or chemical means to remove residual moisture. The resin side "A" includes a mixture of a polyol oligomer, a reactive diluent monomer, and optionally at least one of the following processing aids: catalysts, pigments, surfactants, mold release agents, and crosslinking compounds. Low molecular weight multi-functional crosslinking compounds are preferred.

Next, the resin sides "A" and "B" are mixed in step 2 in an appropriate ratio to produce gelation. Mixing can be done by hand or using high pressure meter-mix equipment with a static or impingement mix head. Such equipment is available from a number of suppliers including Liquid Control Corp. of North Canton, Ohio.

Following mixing, the resin is dispensed in step 6 in order to impregnate the reinforcement material. Typical reinforcement material may be glass roving in chopped, woven or mat form. Reinforcement fibers can also be made of carbon, aramid, or metals. A variety of composite processing methods may be used, as described in the technical article by C. F. Johnson entitled "Resin Transfer Molding," in the Engineered Material Handbook, Vol. 1, available from ASM International, Materials Park, Ohio.

Two preferred methods for step 7 are vacuum assisted resin transfer molding as described in U.S. Pat. Nos. 4,902, 215 and 5,052,906, issued Feb. 20, 1990 and Oct. 1, 1991, respectively, and liquid castable molding as described in U.S. Pat. No. 5,173,142, issued Dec. 22, 1992, with their teachings incorporated herein by reference.

Gelation of the resin encapsulates the reinforcement material, creating a thermoset green-body at B-stage 8. The resin composition is chosen such that this green-body will have a glass transition temperature above room temperature, and typically above 50° C. This is done so that the material will be an easily handled solid part, and will maintain its shape when removed from the mold at 9 and trimmed to net-shape.

The formation of complex structures, such as an aircraft wing, may require separately molding multiple parts, which are then joined together. Although an adhesive is not required, it is preferred that multiple parts are joined together by adhesive bonding using a chemically compatible system. When an adhesive is not used, parts are joined together by radiation crosslinking of carbon double bonds contained in the resin components. A preferred adhesive bonding material is an acrylic structural adhesive containing carbon-to-carbon double bonds which can be cured by means of radiation. Several such adhesives with a range of mechanical and thermal properties are available from the Loctite Company of 705 North Mountain Road, Newington Conn. It is preferable to bond at step 10, rather than after step 13, because stronger bonds and better part fit-up are achieved.

The adhesive can be used to bond together parts made using the materials and method of the present invention, as well as to bond together conventional materials, and combinations thereof. When, for example, two articles, or parts, are being bonded together, the first being a conventional composite, the second being a green-body composite of the present invention, the radiation curing step forms adhesive bonds between the parts, and also cures the second article.

Applying the adhesive and simultaneously curing the adhesive and the composite produces strong joints due to the creation of carbon bonding across the adhesive/composite interface. Such a bond might be expected to be stronger than one between two previously cured composites because of the ability of the polymer, and particularly the polymer chain ends in a B-stage resin, to move during curing, allowing a greater number of bonds per unit area to be formed. The movement of the polymer occurs because the glass transition temperature of the B-stage system is chosen to be lower than the temperature rise of the adhesive-composite interface during cure. The adhesive temperature rise during cure is due to both direct electron beam heating and to the exothermic heat of reaction. A proper choice of adhesive chemical composition will allow the adhesive to heat and react at a lower electron beam dose than the composite to be joined. Such a choice might, for example, restrict the adhesive to contain primarily acrylate functionality, whereas the composite resin might contain primarily less reactive methacrylate functionality.

The green-body at 10 is more flexible and has a lower modulus and glass transition temperature than it does at 13. Components are thus more easily joined at 10. If necessary, some localized heating can be used to facilitate part fit-up. Using bond jigs, several parts may be joined together at this step. An activator capable of initiating the free radical cure of the adhesive may be sprayed onto the composite. Such initiators are also available from the Loctite Company. The bond jigs may be removed after 2–5 minutes and the assembly then is available for curing by electron beam.

After reaching the B-stage, or the optional adhesive bonding, the green-body is cured by radiation, preferably electron beam radiation, to form a final part. Typically, the part is brought to the electron beam accelerator using a material handling system such as a conveyor belt or cart-on-track. Since the part is an easily handled solid, no mold enclosure is required, although some tooling may be required to support the part during transport to the electron accelerator. This tooling can be fabricated from low cost materials such as wood or plaster, since the curing temperature remains quite low (typically less than 70° C.).

Electron accelerators with the necessary parameters for high energy electron beam composite curing are available from a number of manufacturers including Science Research Laboratory of Somerville, Mass., Atomic Energy of Canada Limited of Ontario, Canada and Radiation Dynamics, Inc. of Edgewood, N.Y. A description of the various types of accelerators suitable for this process is described in the chapter by M. R. Cleland, entitled "High Power Electron Accelerators for Industrial Radiation Processing," in the 1992 text entitled "Radiation Processing of Polymers," A. Singh and J. Silverman, editors, available from Oxford University Press.

Figure 5:
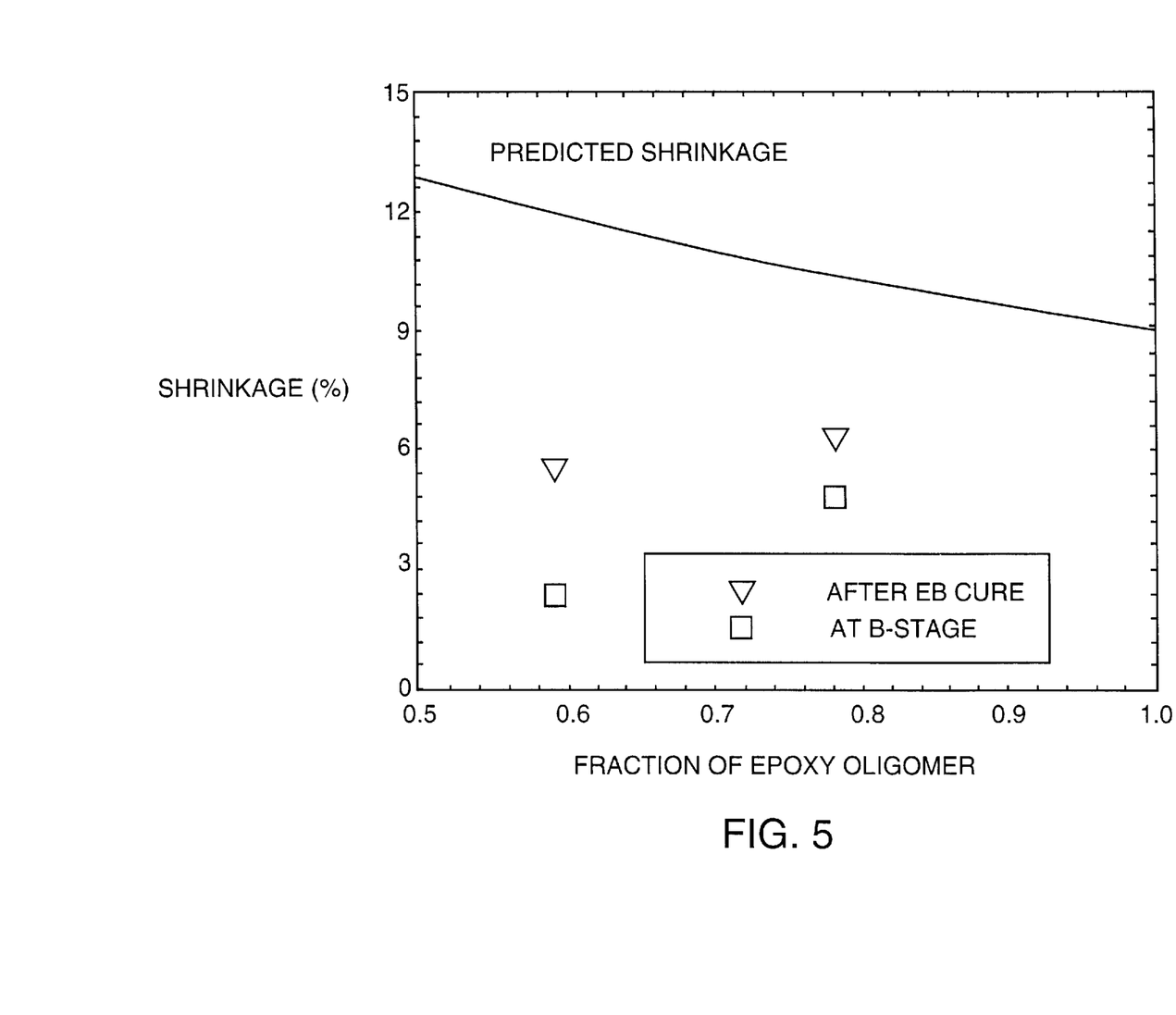
FIG. 5 illustrates a comparison of measured shrinkage values of composites obtained using one method of the present invention, with shrinkage values calculated using published data for typical resins, and shows that the present method can reduce shrinkage by a factor of two, creating composites with less warpage and better fit-up.

Electron beam irradiation causes the formation of a crosslinked carbon bond polymer network which interpenetrates the existing urethane network produced by the step 2 reaction of the isocyanate with the hydroxy-containing compounds. These two networks comprise the final polymer network which has reduced shrinkage, with values that produce good part fit-up. Typical shrinkage values for composites made using the material and method of the present invention are illustrated in FIG. 5. Typical shrinkage values for composites parts made using the material and method of the present invention are about 6%, compared to prior art methods of 9–13%. We believe that the urethane network formed at 2 restricts the shrinkage of the carbon-carbon double-bond-containing compounds, producing localized stresses on the molecular length-scale. This, however, does not affect the material properties, as described in the examples below.

A final (optional) step in fabrication of a composite by the method of the present invention is a post heat treatment as described previously.

Pre-preg Method

In addition to its use for producing structural composites and coatings, the material system described herein can also be used to produce cloth impregnated with the resin system before radiation curing, typically referred to as "pre-preg." The materials and process described herein can be used for fabrication of pre-preg patches used in, for example, the repair of aircraft structures. There are a number of applications where the ability to drape a flexible impregnated cloth and cure it in place has advantages. For example, as aircraft age, corrosion causes the metal (aluminum or titanium) structure to degrade. Composite patches, or pre-pregs, can be used to cover holes and as reinforcement, for example, in aircraft bodies, wings, and fusilage sections.

In the pre-preg process, reinforcement material is impregnated with the thermosetting resin mixture, then the material is immediately pulled through a pre-preg forming machine which includes metal rollers having a variable spacing. By varying the spacing, the resin content (or equivalently, the fiber volume fraction) of the pre-preg is varied. Heating with infrared lamps, in an oven, or by the addition of a metal catalyst is used to increase the resin reaction rate to the B-stage. Once reacted to a tacky, plyable state, the pre-preg material, together with a removable peel-ply backing, is packaged into rolls or sheet for transport. In one embodiment, the patches can be applied using an electron beam curable adhesive, followed by radiation curing in place, preferably with electron beam radiation. Such a concept for the repair of composite parts is described in the 1995 technical article by C. B. Saunders, et. al. in the Journal of the Society for the Advancement of Material and Process Engineering entitled "Electron and X-Ray Curing for Composite Repair." In another embodiment, adhesive is not necessary, and the pre-preg patches of the current invention can be applied directly to a surface, followed by radiation curing in place, preferably with electron beam radiation.

There are several advantages for using the polymer network material of the present invention for this application. By varying the ratio of the "A" and "B" resin components, the resin viscosity and pre-preg degree of tack can be varied. The viscosity of resins prior to fabric impregnation is often reduced by dissolving the resin in a solvent. Using the polymer network material of the present invention eliminates the need to use hazardous solvents, and produces a pre-preg with a controlled stiffness and degree of tack. The reduction in resin cure shrinkage will reduce the stresses in the applied patch, and should improve the adhesion of the repair patch to the substrate, as when the material is used as a coating.

In this case, the ratio of epoxy oligomer to reactive diluent monomer in the resin side "A", and the ratio of the resin parts "A" and "B" is modified to produce a flexible material at B-stage. By reducing the amount of hardener "B" and increasing the amount of reactive monomer in the "A" side, the flexibility at B-stage is increased.

The function and advantage of these and other embodiments of the present invention will be more fully understood from the examples below. The following examples are intended to illustrate the benefits of the present invention, but do not exemplify the full scope of the invention.

EXAMPLE 1

Resin shrinkage leads to composite warpage and poor part fit-up. The shrinkage of neat resin samples was measured by displacement in water (Archimedes Method) in accordance with ASTA4 Standard D792-96. The results are shown in FIG. 5.

Two resin compositions were prepared using the compounds illustrated in FIG. 3, with different ratios of epoxy-derived oligomer to reactive diluent monomer. The composition with 60% epoxy-based oligomer and 40% reactive monomer diluent has been used successfully for composite manufacture using the vacuum assisted resin transfer molding (VARTM) process. This composition has a lower viscosity due to the lower fraction of epoxy-based oligomer. The material with 78% epoxy-based oligomer and 22% reactive monomer diluent has a higher viscosity, and has been used for composite fabrication using the high pressure resin transfer molding (RTM) process.

The shrinkage at B-stage 8 and after electron beam cure 11 is shown in FIG. 5. (As used herein, percentage shrinkage is given by $100 * (\rho_s - \rho_1)/\rho_1$, where $\rho_1$ and $\rho_s$ are the liquid and solid densities.) Also shown is the expected shrinkage of these resins using published and measured shrinkage data for the resin components, combined using a law of mixtures approach. The predicted shrinkage curve in FIG. 5 was calculated using all components, their densities, functionalities and known radiation-cure shrinkages.

The data in FIG. 5 shows that the actual shrinkage of resins produced using this technique is significantly less than would be expected by someone skilled in the area of radiation cured materials.

EXAMPLE 2

Composite test panels to measure warpage were fabricated using this technique. Reinforcement material was woven S-2 glass roving at a fiber volume fraction of approximately 50%. To maximize the composite warpage, half the plys were laid up at a 45° angle. Warpage of the composite was measured by edge displacement. Warpage of the panels made using this technique was less than half that of identical panels made using a conventional resin matrix (Dow Derakane Vinyl Ester IIC-50, Dow Chemical Co, Midland Mich.)

This result together with the result of Example 1 implies that the technique produces panels with less shrinkage and lower warpage which will improve part fit-up.

EXAMPLE 3

Composite test panels to measure mechanical and thermal properties were made using this technique. Reinforcement materials included woven S-2 glass roving and graphite fiber cloth, at fiber volume fraction of approximately 50%. Glass transition temperature (a measure of final use temperature) was in the range of 110°–170° C. depending upon exact composition and radiation dose, increasing to 156°–212° C. after a post heat cure. The values given correspond to the peak in the loss modulus as measured using dynamic mechanical analysis.

Tensile tests made on the glass fiber-reinforced composite panels showed higher values (100 ksi) than tests on similar panels with conventional vinyl ester (Dow Derakane resin) matrix.

These results document the description of step 13, and the statement that the mechanical properties are not reduced by the presence of shrinkage stresses on the molecular level.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method for producing a fiber-reinforced composite comprising the steps of:

mixing a first resin component and a second resin component to produce a resin mixture capable of reacting to form a solid at or near room temperature, infiltrating a fiber reinforcement material with the resin mixture;

allowing the resin mixture to produce a first polymer network wherein at least a portion of the first network is thermoset; and exposing the first polymer network to radiation to produce a final polymer network.

2. The method of claim 1, wherein the first polymer network at step b. is formed by chemical linkages of the urethane type and the final polymer network at step c. is formed by free radical polymerization initiated by electron beam radiation.

3. The method of claim 1, wherein in step a. the first resin component is a mixture containing an oligomer with hydroxyl groups and unreacted carbon-to-carbon double bonds and the second resin component is a hardening agent containing a polyisocyanate.

4. The method of claim 1, wherein in step a. the first resin component contains an epoxy resin mixed with a reactive diluent containing acrylic functionality and the second resin component is a hardening agent designed to gel epoxies including one of an amine, an anhydride and a thiol.

5. The method of claim 1, further comprising the step of:

positioning the fiber reinforcement material in a mold, such that the first polymer network is reinforced by the fiber reinforcement material; and the resin mixture is formed in an appropriate ratio to produce a solid which is sufficiently rigid so that it can be removed from the mold.

6. The method of claim 1, further comprising the steps of:

applying a radiation curable adhesive to a surface of the reinforced first polymer network and joining the reinforced first polymer network with a second article before the step of exposing the first polymer network to radiation.

7. The method of claim 6, wherein a flexibility of the first polymer network is greater than a flexibility of the final polymer network, such that better part fit-up and stronger adhesive bonding are achieved when done before exposing the thermoset first network to radiation.

8. The method of claim 1, further comprising the step of elevating the temperature of the final polymer network for a period of time such that the final use temperature of the composite is increased.

9. The method of claim 1, wherein the process by which the fiber-reinforced composite is formed includes one of resin transfer molding (RTM), vacuum assisted resin transfer molding (VARTM), pre-preg, pultrusion, and stamping operations such as are used to form sheet molding compound.

10. The method of claim 1, wherein the fiber reinforcement material includes at least one of: chopped roving, woven roving, mats of glass, carbon, aramid, and metal.

11. The method of claim 1, wherein a metal catalyst is added to at least one of the resin components to decrease the time until formation of the thermoset first polymer network.

12. The method of claim 1, wherein the final polymer network is an interpenetrating network.

13. A method for producing a fiber-reinforced composite comprising the steps of:

mixing a two-component resin wherein the first resin component is a mixture comprising an oligomer containing hydroxyl groups and unreacted carbon-to-carbon double bonds, a monomer diluent including unreacted carbon-to-carbon double bonds, low molecular weight crosslinking aids containing two or more hydroxyl groups and a metal-based catalyst, and the second resin component is a hardening agent containing a polyisocyanate, such mixture being capable of utilizing linkages of the urethane type to form a thermoset first polymer network, impregnating a fiber reinforcement material positioned inside a mold with the two-component resin mixture to form a gelled B-stage network, wherein at least a portion of the network is thermoset, so that after reaction it is sufficiently rigid to be removed from the mold;

bonding at least two components using radiation curable adhesive;

exposing the thermoset first polymer network to radiation to produce a final polymer network; and exposing the final polymer network to heat.

14. The method of claim 13, wherein the final polymer network is an interpenetrating network.

15. A method for forming an article comprising the steps of:

forming a mixture of a first resin component, a second resin component, and a third resin component;

reacting the first resin component with the second resin component to form a first polymer network, wherein at least a portion of the first polymer network is thermoset, the first polymer network being formed in the presence of the third resin component, the third resin component remaining free of linkage to the thermoset first polymer network; and irradiating the thermoset first polymer network to chemically link the third resin component the first polymer network to form a second polymer network.

16. The method of claim 15, wherein the mixture is applied to a plurality of reinforcing fibers positioned in a mold such that the first polymer network is formed in the mold, the method involving irradiating the first polymer network to form the second polymer network, the second polymer network after radiation defining a part.

17. The method of claim 16, wherein the first polymer network is reinforced by the reinforcing fibers and the reinforced first polymer network and the part each have a volume, such that the volume of the part is no more than 6% less than the volume of the reinforced first polymer network.

18. The method of claim 15, further comprising the step of heating the second polymer network after irradiation to induce further intra-network linkage.

19. The method of claim 15, wherein the step of reacting a first resin component with a second resin component to form a first polymer network involves thermally-driven formation of covalent bonds.

20. The method of claim 15, wherein the step of chemically linking the third resin component to at least two separate functional groups of the first polymer network to form a second polymer network involves formation of covalent bonds.

21. The method of claim 15, wherein the step of chemically linking the third resin component to at least two separate functional groups of the first polymer network to form a second polymer network is accomplished by irradiating the first polymer network.

22. The method of claim 21, wherein the step of irradiating involves applying radiation including at least one of x-ray, gamma, ultra-violet, electron beam, and laser radiation.

23. The method of claim 15, further comprising the step of applying the mixture to a surface that provides support for the first polymer network.

24. The method of claim 23, wherein the surface is a surface of a fiber.

25. The method of claim 24, wherein the fiber is woven into a fabric.

26. The method of claim 25, further comprising the step of applying the fabric to a second surface before the step of chemically linking the third resin.

27. The method of claim 24, wherein said fiber includes at least one of woven glass roving, mat glass roving, carbon, aramid, metals, and fiberglass.

28. The method of claim 15, wherein the applying step comprises impregnating a plurality of reinforcing fibers with the first polymer network.

29. The method of claim 28, wherein the plurality of reinforcing fibers is enclosed in a mold.

30. The method of claim 15, wherein said first resin component comprises a polyol including at least one hydroxyl group and at least one site of unsaturation.

31. The method of claim 30, wherein said polyol is an oligomer which is the product of the synthesis of a multifunctional epoxy with methacrylic acid.

32. The method of claim 31, wherein said oligomer has a formula:

wherein R is a hydrocarbon linkage selected from the group consisting of alkyl, alkenyl, alkynyl, cycloalkyl, aryl, alkaryl, and aralkyl, optionally interrupted by a hetero atom;

wherein $R_1$ is as defined for R, and can in addition be H.

33. The method of claim 32, wherein R includes a hetero atom selected from the group consisting of oxygen, nitrogen, sulfur and fluorine.

34. The method of claim 32, wherein R is a $C_1-C_{10}$ linear alkyl linkage.

35. The method of claim 32, wherein $R_1$ is H or $C_1-C_{10}$ alkyl linkage.

36. The method of claim 15, wherein said second resin component is selected from the group consisting of polymethylene, polyphenyl, and isocyanate.

37. The method of claim 36, wherein said second resin component is 4,4'-methylene bisphenyl isocyanate.

38. The method of claim 15, wherein said second resin component is a polyisocyanate.

39. The method of claim 15, wherein said third resin component is a reactive monomer diluent including sites of unsaturation, but not including hydroxyl groups.

40. The method of claim 39, wherein said reactive monomer diluent has a formula:

wherein $R_2$ is a hydrocarbon linkage selected from the group consisting of alkyl, alkenyl, alkynyl, cycloalkyl, aryl, alkaryl, and aralkyl.

41. The method of claim 15, wherein said first resin component further comprises at least one of photoinitiators, mold release agents, crosslinking aids, surfactants, pigments, and toughening agents.

42. The method of claim 15, wherein the final polymer network is an interpenetrating network.

43. A method for forming a composite article comprising:

providing a composite article having a surface, the composite article formed by reacting a first resin component with a second resin component to form a first polymer network, wherein at least a portion of the first polymer network is thermoset, the first polymer network being formed in the presence of a third resin component and reinforcing fibers, the third resin component remaining free of linkage to the first resin component and the second resin component;

applying an adhesive to a portion of the surface of the composite article and to a surface of a second article;

joining the surface of the composite article to the surface of the second article; and irradiating the composite article to chemically link the third resin component to at least two separate functional groups of the first polymer network to form a second polymer network and to form adhesive bonds between the adhesive and the composite article, wherein the adhesive bonds are carbon-to-carbon bonds formed during the irradiation step.

44. The method of claim 43, wherein the final polymer network is an interpenetrating network.

* * * * *